3,505,276
ORGANOPOLYSILOXANE ELASTOMERS COMPOUNDED WITH ALKOXY SILANES
William Earl Hutchinson, Adrian, Mich., assignor, by mesne assignments, to Stauffer-Wacker Silicone Corporation, a corporation of Delaware
No Drawing. Filed Feb. 8, 1967, Ser. No. 614,572
Int. Cl. C08g 51/04, 47/06
U.S. Cl. 260—37                             5 Claims

ABSTRACT OF THE DISCLOSURE

An alkoxy siloxane is incorporated in a silicone gum to prevent hardening on aging of the gum. On vulcanization, the resulting elastomer is found to possess improved properties, particularly as regards tensile strength and resistance to tear.

---

This invention relates to vulcanizable organopolysiloxane compositions and to the elastomers derived therefrom. More particularly, the invention is concerned with such compositions and elastomers as prepared using silica fillers which are reinforcing.

Silica fillers of this type tend to cause hardening of the vulcanizable material prior to vulcanization. To combat such hardening, it has been heretofore proposed to incorporate in the material an hydroxylated silane or siloxane. While reasonably effective in point of preventing the hardening, it has been found that the resulting elastomers are frequently deficient in respect of characteristics essential in certain applications. Thus, for example, it has been difficult, using material incorporating the hydroxy additive, to manufacture elastomers having both high elongation and good resiliency.

The present invention is founded on the discovery that if, in lieu of the hydroxy additive, there is used a relatively low molecular weight siloxane comprising alkoxy groups, including preferably, terminal alkoxy groups, the indicated disadvantages are obviated and a compound of improved handling characteristics attained. And these desiderta result even though the alkoxy siloxane is employed in lesser quantity.

An alkoxy siloxane as employed according to the invention has an average molecular weight of less than 1,000 and a viscosity not in excess of 50 centistokes at room temperature. In general, the applicable materials conform with the formula:

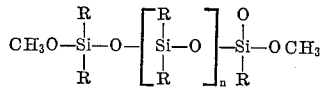

in which R is methyl, methoxy, phenyl or phenoxy and $n$ is 0–3.

The alkoxy siloxane material preferred in the practice of the invention averages out to the formula:

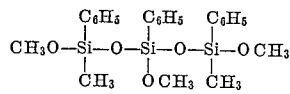

Such material has an average molecular weight of about 470 and a combining weight of about 155. The total silicone content of the material (as hydrolyzed) is about 85 weight percent, the methoxy content about 20 weight percent. Measured at 77° F., the specific gravity and viscosity are of the order of 1.105 and 13 (cs.), respectively.

Within limits, the quantity of the alkoxy siloxane employed is largely determined by the improvement sought. Amounts in excess of 20 parts per 100 parts of the compound to be vulcanized (including fillers, pigments and catalyst) generally afford no advantage over lesser amounts, in fact the effect may be adverse. As little as 2 parts may be sufficient in some cases. In the main, however, from 5 to 15 parts of the alkoxy siloxane are used.

Using the alkoxy siloxane additive, the compound develops a glossy, waxy sheen in the mill and exhibits no tendency either to crack and fall off the rolls or to stick thereto. In other words, the modified compound is remarkably easy to handle. After being stripped from the rolls, it remains soft and workable even when stored for longer than normal periods.

The various improvements afforded by the invention are illustrated by the following Table I which permits of a comparison with prior practice. In the table, all parts recited are by weight and are based on 100 parts of silicone gum, the particular gum being derived in the conventional manner from dimethyldichlorosilane and containing a modicum of vinyl groups.

TABLE I

|  | Hydroxyl additive [1] | | Alkoxy additive,[2] parts |
|---|---|---|---|
|  | Parts | Parts |  |
|  | 11.0 | 18.0 | 10.0 |
| Filler Additions: |  |  |  |
| Cab-O-Sil MS-7 (reinforcing silica) | 15.0 | 15.0 | 15.0 |
| Min-U-Sil (non-reinforcing silica) | 25.0 | 25.0 | 25.0 |
| Red Pigment (Fe$_2$O$_3$) | 1.0 | 1.0 | 1.0 |
| 2,4-dichlorobenzoylperoxide (catalyst) | 1.0 | 1.0 | 1.0 |
| Softening times | 5.0 min. | Immediate | 1.0 min. |
| 10′ at 240° F.: |  |  |  |
| Durometer | 57 | 51 | 51 |
| Tensile Strength | 1,100 | 900 | 1,140 |
| Elongation | 350 | 550 | 650 |
| 100% Modulus | 160 | 185 | 160 |
| 300% Modulus | 880 | 495 | 485 |
| Tear Resistance | 85 | 130 | 150 |
| 4 hrs. at 480° F.: |  |  |  |
| Durometer | 64 | 65 | 58 |
| Tensile Strength | 1,040 | 900 | 1,000 |
| Elongation | 250 | 310 | 340 |
| 100% Modulus | 300 | 300 | 220 |
| 300% Modulus |  | 830 | 825 |
| Tear Resistance | 70 | 90 | 110 |

[1] Hydroxy terminated dimethyl polysiloxane fluid plus 20% reinforcing silica and small quantity of iron octoate, a heat stabilizer.
[2] Dimethyltriphenyltrimethoxytrisiloxane plus 20% reinforcing silica and small quantity of iron octoate, a heat stabilizer.

It should be observed that the incorporation of reinforcing silica with the alkoxy additive corresponds to a common expedient followed to facilitate mechanical mixing of low viscosity additives and silicone gum compositions.

In each case, the vulcanization carried out at 240° F. over a period of ten minutes made use of an hydraulic press provided with heating means and operated at a pressure of about 1,000 p.s.i. The four-hour bake was effected in a conventional oven. Incident thereto, the residual peroxide and other volatile materials were substantially completely removed.

To discuss now the values shown in the Table I, it is to be first noted that the durometer readings reflect an economic advantage in the alkoxy additive, particularly in that the permissibility of the inclusion of additional filler without untoward effect on the plasticity is thereby suggested.

As to tensile strength, the alkoxy additive compares quite favorably at the equivalent filler loading, while the elongation values show definite superiority in the alkoxy additive.

The modulus readings (p.s.i. required to achieve the percent elongation indicated) are surprising, because it would be expected, considering the higher elongation values on the elastomer incorporating the alkoxy additive, that such readings would be much lower.

The higher tear resistance provided by the alkoxy additive vis-a-vis the hydroxy fluid is manifestly advantageous in most applications.

Table II below provides a further comparison. Here the gum stock was a mixed methyldiphenylsiloxane analyzing about 92.36 mole percent dimethyl and about 7.5 mole percent diphenyl, the small balance being accounted for by methyl-vinyl groups. As in the case of Table I, the parts recited are by weight and are based on 100 parts by weight of gum.

TABLE II

| | Hydroxy Additive [1] | | Alkoxy Additive [2] | | | | | | |
|---|---|---|---|---|---|---|---|---|---|
| Filler additions: | | | | | | | | | |
| Additive | 20.00(OH) | | 10.00(RO) | | | 15.00(RO) | | | |
| Cab-O-Sil S-17 | 35.00 | | 35.00 | | | 35.00 | | | |
| Min-U-Sil | 2.00 | | 2.00 | | | 2.00 | | | |
| Heat stabilizer | 0.25 | | 0.25 | | | 0.25 | | | |
| Peroxide | 0.80 | | 0.80 | | | 0.80 | | | |
| Cure temp. and time | (3) | (4) | (3) | (5) | (6) | (3) | (5) | (6) | (7) |
| Durometer | 41 | 62 | 40 | 46 | 50 | 33 | 53 | 58 | 63 |
| Tensile Strength | 1,005 | 940 | 1,665 | 1,730 | 1,520 | 1,200 | 1,495 | 1,500 | 1,180 |
| Elongation | 600 | 320 | 785 | 640 | 500 | 880 | 750 | 720 | 490 |
| 100% Modulus | 100 | 290 | 80 | 100 | 170 | -------- | 100 | 110 | 195 |
| 300% Modulus | 400 | 825 | 300 | 500 | 650 | -------- | 340 | 405 | 600 |
| Tear Resistance | 105 | 117 | 265 | 227 | 215 | 234 | 196 | 186 | 144 |

[1] Organopolysiloxane fluid having terminal OH groups.
[2] Dimethyltriphenyltrimethoxytrisiloxane.
[3] 10 minutes at 260° F.
[4] 24 hours at 480° F.
[5] 4 hours at 400° F.
[6] 16 hours at 400° F.
[7] 24 hours at 480° F.

It is not considered that any discussion of Table II is necessary since the comments made with respect to Table I obviously apply with equal force to Table II. It should be noted, however, that the improvement in tensile strength, tear resistance and elongation is even more pronounced with respect to a methyldiphenyl gum. Similar results are achieved using gums containing methyl phenyl siloxy, methyltrifluoropropyl siloxy and similar groups as a part of the gum polymer.

The silica fillers employed according to the invention are in general referred to as silica aerogels and fume silicas. In some quarters, these are identified generically as "pyrogenic silicas."

Any suitable vulcanizing agent may be employed in the practice of the invention. Among the many applicable agents may be mentioned organic peroxides, such as 2,4-dichlorobenzoyl peroxide, tertiary-butylperbenzoate, benzoyl peroxide and tertiary-butylperacetate. The vulcanizing agent is usually incorporated in an amount within the range .05 to 5.0 parts per 100 parts of the silicone gum.

The order of addition of the alkoxy additive is not critical, but for the reasons previously indicated herein, it is preferred to apply the additive in admixture with one of the filler components, normally the reinforcing silica.

As suggested by the tables herein, the compound materials are converted into siloxane elastomers by the application of heat. No criticality is to be attached to the heating periods and temperatures given in the tables because valuable products may be otherwise produced.

The invention claimed is:

1. A vulcanizable composition comprising a silicone gum having incorporated therein a reinforcing quantity of a reinforcing silica filler and from 2 to 20 parts by weight per 100 parts of said gum of a siloxane material averaging out to the formula

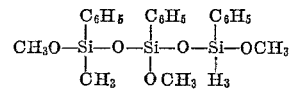

2. A composition according to claim 1 additionally incorporating a catalytic quality of a peroxide vulcanizing agent.

3. The vulcanizate obtained by the vulcanization of a composition conforming to claim 2.

4. A vulcanizable composition comprising a silicone gum from the class consisting of methyl-vinyl silicone gums and methylphenyl-vinyl silicone gums, said silicone gums having incorporated therein a reinforcing quantity of a pyrogenic silica filler, a heat stabilizer, a peroxide vulcanizing agent and from 5 to 15 parts by weight per 100 parts of said gum of a siloxane material averaging out to the formula

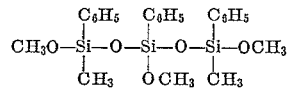

5. The vulcanizate obtained by the vulcanization of a composition conforming to claim 4.

References Cited

UNITED STATES PATENTS 3,231,542   1/1966   Eisinger et al.
3,234,175   2/1966   Pike.

MORRIS LIEBMAN, Primary Examiner

L. T. JACOBS, Assistant Examiner.

UNITED STATES PATENT OFFICE
CERTIFICATE OF CORRECTION

Patent No. 3,505,276   April 7, 1970

William Earl Hutchinson

It is certified that error appears in the above identified patent and that said Letters Patent are hereby corrected as shown below:

Column 4, lines 7 to 10, the formula should appear as shown below:

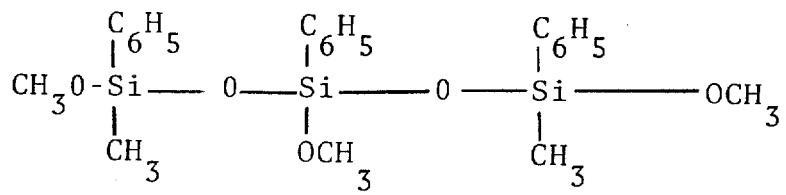

Signed and sealed this 20th day of April 1971.

(SEAL)
Attest:

EDWARD M. FLETCHER, JR.
Attesting Officer

WILLIAM E. SCHUYLER, JR.
Commissioner of Patents